(12) United States Patent
Harimoto et al.

(10) Patent No.: US 6,334,714 B1
(45) Date of Patent: Jan. 1, 2002

(54) NEEDLE ROLLER BEARING

(75) Inventors: Kazuyoshi Harimoto; Shingo Kono, both of Shizuoka (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/453,212

(22) Filed: Dec. 3, 1999

(30) Foreign Application Priority Data

Dec. 7, 1998 (JP) .......................................... 10-346385

(51) Int. Cl.$^7$ ................................................ F16C 33/58
(52) U.S. Cl. ..................................... 384/569; 384/905.1
(58) Field of Search ............................... 384/905.1, 569, 384/581, 513, 526

(56) References Cited

U.S. PATENT DOCUMENTS 5,020,925 A * 6/1991 Stephen et al. ............. 384/569

* cited by examiner

Primary Examiner—Lenard A. Footland
(74) Attorney, Agent, or Firm—Wenderoth, Lind & Ponack, L.L.P.

(57) ABSTRACT

A shell type needle roller bearing for a universal joint is provided which can eliminate radial gaps. A plurality of needle rollers are mounted in an outer ring which has a cylindrical portion adapted to be fitted in a bearing ring formed in a bifurcated piece of a yoke and having a bottom at one end. The cylindrical portion is formed by three arcuate wall portions having equal circumferential lengths to each other. When a trunnion of a universal joint is inserted into the shell type needle roller bearing, the arcuate wall portions are resiliently deformed radially outwardly through the needle rollers, so that the needle rollers are pressed against the outer circumferential surface of the trunnion by the recovering resilience. This prevents formation of radial gaps.

10 Claims, 2 Drawing Sheets

NEEDLE ROLLER BEARING

BACKGROUND OF THE INVENTION

This invention relates to a needle roller bearing mounted in a universal joint.

There is known an automotive steering device for steering vehicle wheels by the rotation of a steering wheel. It comprises steering shafts for transmitting the rotation of the steering wheel to a steering box, the steering shafts including two shafts having an angle relative to each other and coupled together by a universal joint for transmission of a turning torque.

FIGS. 3A, 3B show a universal joint used in such a steering device. The universal joint has a pair of yokes 20 each having a bifurcated piece 21 formed with a bearing hole 22 into which is inserted a trunnion 24 formed on a spider 23. Each trunnion 24 is rotatably supported by a shell type needle roller bearing 30 pressed into the bearing hole 22.

The shell type needle roller bearings 30 each comprise an outer ring 31 comprising a cylindrical portion 31a pressed into the bearing hole 22 and having a bottom 31b at one end, and a plurality of needle rollers 33 rollable along a raceway 32 on the inner circumferential surface of the cylindrical portion 31a. The outer ring 31 is formed by pressing a thin metal sheet.

In the universal joint, if there is a radial gap $\Delta r$ between the trunnions 24 of the spider 23 and the needle roller bearings 30, shaky motion resulting from the radial gap will occur between the joint portions of the pair of yokes 20, making it impossible to smoothly transmit torque between the two shafts each connected to the yokes 20.

Thus, for a steering device, in order to improve the turning operability of the steering wheel, it is desired to narrow radial gaps between the needle roller bearings and the trunnions. For this purpose, trials have been made to narrow the tolerance of dimensions of the parts. With the exception of the spiders 23, the yokes 20 and the outer rings 31 of the needle roller bearings 30 are formed by pressing. Thus there were limitations.

Heretofore, after the shell type needle roller bearing 30 has been pressed into the bearing hole 22 of each yoke 20, a trunnion 24 having an outer diameter suitable for the needle roller bearing 30 is selected and combined.

For such a universal joint of a type in which after the needle roller bearing 30 has been pressed in, a trunnion 24 is selected and combined, assembling is extremely troublesome and time-consuming.

An object of this invention is to provide a shell type needle roller bearing for a universal joint which can eliminate radial gaps.

SUMMARY OF THE INVENTION

According to this invention, there is provided a shell type needle roller bearing for a universal joint having a yoke, the needle roller comprising an outer ring made of a thin metal sheet and including a cylindrical portion having a bottom at one end thereof and an inner raceway and adapted to be inserted into a bearing hole formed in a bifurcated piece of the yoke, and a plurality of needle rollers arranged so as to be rollable along the inner raceway of the cylindrical portion, characterized in that the cylindrical portion is formed by a plurality of arcuate wall portions having their circumferential lengths substantially equal to each other.

With this arrangement, when the trunnion of the spider is inserted into the needle roller bearing, the intermediate portion of each of the arcuate wall portions forming the cylindrical portion is deformed radially outwardly by the trunnion through the needle rollers. The rollers are therefore biased against the cylindrical surface of the trunnion by the arcuate wall portions. This eliminate any radial gaps present between the needle roller bearing and the trunnion.

The arcuate walls may extend the entire width of the outer ring or only part thereof. But to stably support the needle rollers, their width has to be equal to or greater than 1/3 of the axial width of the outer ring.

To stably mount the outer ring in the bearing hole, the number of arcuate wall portions is preferably 3 or more.

There exist radial gaps of 5–6 $\mu$m or greater in a conventional shell type roller bearing in a universal joint, and such large radial gaps cause various problems. Thus, if the roundness of the outer circumferential surface of the cylindrical portion formed by the arcuate wall portions is 3 $\mu$m or greater it is possible to completely eliminate the radial gaps.

Other features and objects of the present invention will become apparent from the following description made with reference to the accompanying drawings, in which:

DETAILED DESCRIPTION OF THE PREFERRED EMBODIMENT

Figure 1:
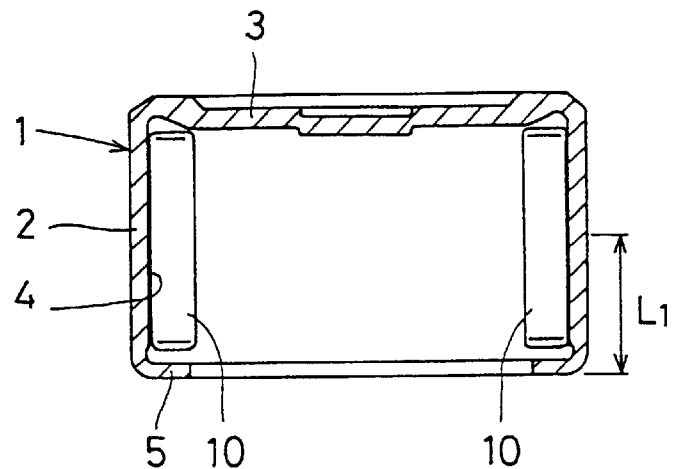
FIG. 1 is a vertical sectional front view of a shell type needle roller bearing embodying this invention.

An embodiment of this invention is described with reference to FIGS. 1 and 2. The shell type needle roller bearing comprises an outer ring 1, and a plurality of rollers mounted in the outer ring.

The outer ring 1 is formed by pressing a thin metal sheet. It includes a cylindrical portion 2 having a bottom 3 at one end. The needle rollers 10 can roll along a raceway 4 formed on the inner circumferential surface of the cylindrical portion 2 and are prevented from falling by a flange 5 formed at the other end of the cylindrical portion 2.

The cylindrical portion 2 of the outer ring 1 is formed by three arcuate wall portions 2a having circumferential lengths substantially equal to each other.

With a universal joint in which trunnions are rotatably supported by shell type needle roller bearings, radial gaps causing problem are about 5 to 6 $\mu$m. Thus the roundness of the cylindrical portion 2 of the outer ring 1 is set at 3 $\mu$m or over.

Figure 3A:
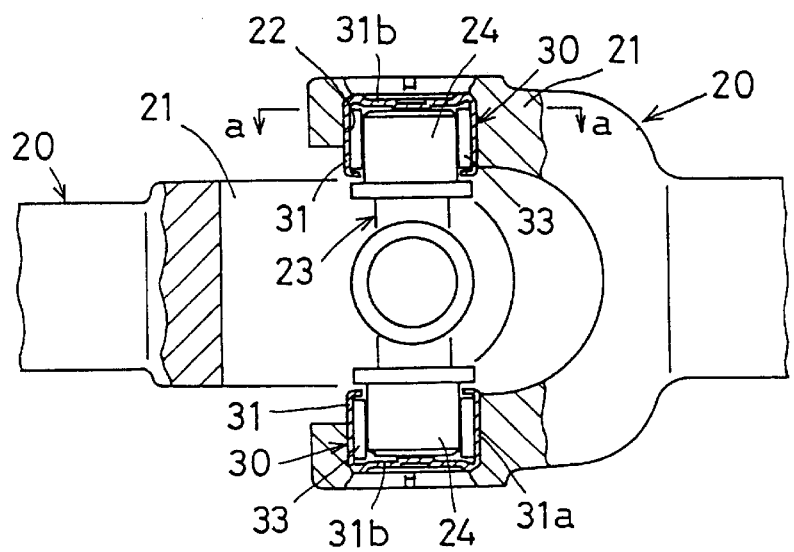
FIG. 3A is a vertical sectional front view of a universal joint using a conventional shell type needle roller bearing.
Figure 3B:
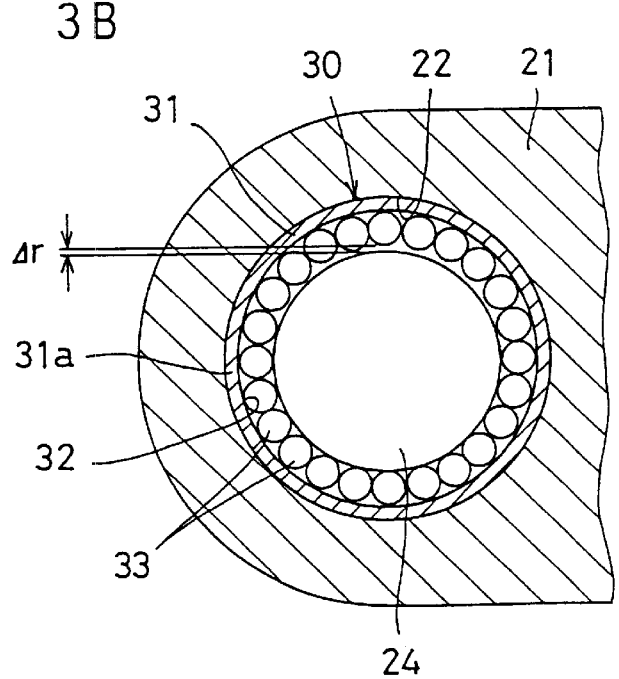
FIG. 3B is a sectional view taken along line a—a of FIG. 3A.

With a shell type needle roller bearing A having such a structure, the cylindrical portion 2 of the outer ring 1 is pressed into the bearing hole 22 formed in the bifurcated piece 21 of each yoke 20 shown in FIG. 3, and a trunnion 24 is inserted within the circumferentially arranged needle rollers 10 to rotatably support the trunnion.

When the cylindrical portion 2 is pressed into the bearing hole 22, connecting portions 2b between the adjacent arcuate wall portions 2a forming the cylindrical portion 2 are pressed against the inner wall of the bearing hole 22, while at the center of the circumferential length of the arcuate wall portions 2a, small gaps are formed between the wall portion and the inner wall of the bearing hole, or it is lightly in contact with the inner wall.

Figure 2:
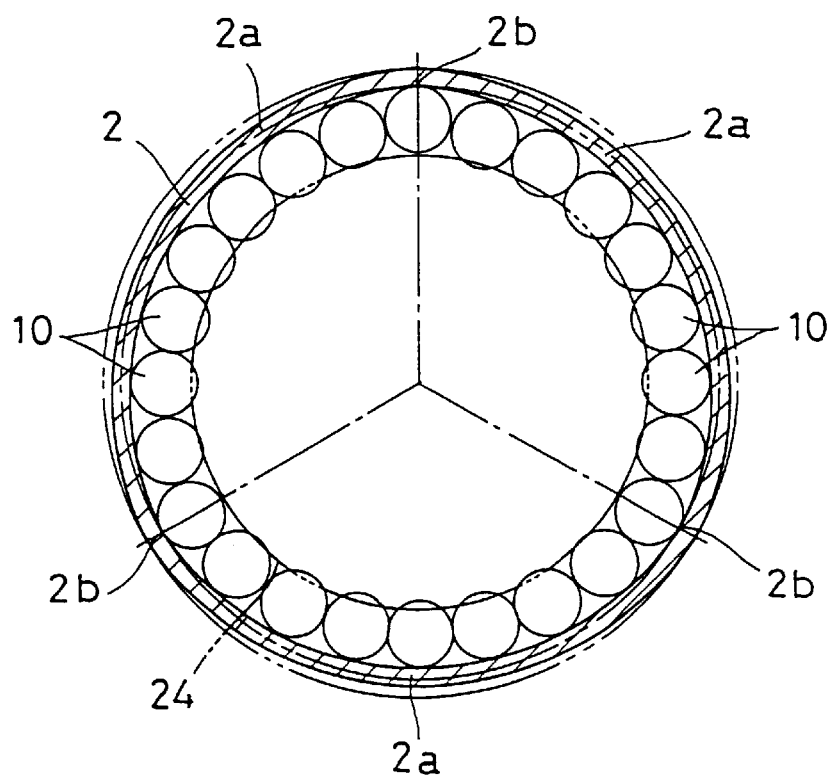
FIG. 2 is a cross-sectional side view thereof.

Also, with the trunnion 24 inserted within the needle rollers 10 of the shell type needle roller bearing A mounted in the bearing hole 22, three arcuate wall portions 2a of the cylindrical portions 2 are pressed outwardly at their circumferential bisecting positions by the trunnion through the needle rollers 10, and resiliently deformed radially outwardly as shown by chain lines in FIG. 2. The needle rollers 10 are thus pressed against the outer circumferential surface of the trunnion 24 by the recovering resilience due to deformation. Thus, no radial gaps are formed between the shell type needle roller bearings and the trunnion 24. It is thus possible to smoothly transmit torque between the two yokes 20 shown in FIG. 3.

Since the number of arcuate portions 2a is three, the shell type needle roller bearing is strongly brought into resilient contact with the trunnion 24 at three points at intervals of 120°, so that the trunnion can be supported extremely stably.

If the width L1 of the arcuate portions 2a is less than one third (⅓) of the axial width of the outer ring 1, stability of the needle rollers 10 will deteriorate. Thus, as shown in FIG. 1, the width dimension L1 is preferably ⅓ or over of the axial width L0 of the outer ring from its open end (FIG. 1).

As described above, according to this invention, when the trunnion is inserted into the shell type needle roller bearing, the arcuate walls are resiliently deformed radially outwardly, so that the needle bearings are pressed against the outer circumferential surface of the trunnion by the recovering resilience. It is thus possible to eliminate radial gaps between the needle roller bearing and the trunnion, and thus to smoothly transmit turning torque between two yokes of the universal joint.

What is claimed is:

1. A shell type needle roller bearing comprising:
   a substantially cylindrical portion comprising a plurality of arcuate wall portions, said substantially cylindrical portion having a bottom at one end thereof a central axis, and an inner raceway; and
   a plurality of needle rollers arranged so as to be rollable along said inner raceway of said substantially cylindrical portion;
   wherein said plurality of arcuate wall portions have arcuate lengths, respectively, said arcuate lengths being substantially equal to each other;
   wherein said plurality of arcuate wall portions have uniform thicknesses, respectively, said uniform thicknesses being substantially equal to each other;
   wherein a first point is located on the outer periphery of said substantially cylindrical portion such that a corresponding first radial distance from the central axis to the first point on the outer periphery of said substantially cylindrical portion is a minimum distance;
   wherein a second point is located on the outer periphery of said substantially cylindrical portion such that a corresponding second radial distance from the central axis to the second point on the outer periphery of said substantially cylindrical portion is a maximum distance;
   wherein there is a difference between the first radial distance and the second radial distance; and
   wherein the radial distances from the central axis to intermediate points, respectively, on the outer periphery of said substantially cylindrical portion that are between the first point and the second point vary continuously from the minimum distance to the maximum distance.

2. The shell type needle roller bearing as claimed in claim 1, wherein said arcuate wall portions have a width of at least one third of the axial width of said substantially cylindrical portion.

3. The shell type needle roller bearing as claimed in claim 2, wherein said plurality of arcuate wall portions comprises at least three arcuate wall portions.

4. The shell type needle roller bearing as claimed in claim 3, wherein the difference between the first radial distance and the second radial distance is at least 3 μm.

5. The shell type needle roller bearing as claimed in claim 2, wherein the difference between the first radial distance and the second radial distance is at least 3 μm.

6. The shell type needle roller bearing as claimed in claim 1, wherein said plurality of arcuate wall portions comprises at least three arcuate wall portions.

7. The shell type needle roller bearing as claimed in claim 6, wherein the difference between the first radial distance and the second radial distance is at least 3 μm.

8. The shell type needle roller bearing as claimed in claim 1, wherein the difference between the first radial distance and the second radial distance is at least 3 μm.

9. The shell type needle roller bearing as claimed in claim 1, wherein said substantially cylindrical portion is metal.

10. A universal joint comprising:
    a spider;
    a trunnion located on said spider;
    a shell type needle roller bearing operable to permit rotational movement of said trunnion, said needle roller bearing comprising:
      a substantially cylindrical portion comprising a plurality of arcuate wall portions, said substantially cylindrical portion having a bottom at one end thereof, a central axis, and an inner raceway; and
      a plurality of needle rollers arranged so as to be rollable along said inner raceway of said substantially cylindrical portion;
      wherein said plurality of arcuate wall portions have arcuate lengths, respectively, said arcuate lengths being substantially equal to each other;
      wherein said plurality of arcuate wall portions have uniform thicknesses, respectively, said uniform thicknesses being substantially equal to each other; and
      wherein a first point is located on the outer periphery of said substantially cylindrical portion such that a corresponding first radial distance from the central axis to the first point on the outer periphery of said substantially cylindrical portion is a minimum distance;
      wherein a second point is located on the outer periphery of said substantially cylindrical portion such that a corresponding second radial distance from the central axis to the second point on the outer periphery of said substantially cylindrical portion is a maximum distance;
      wherein there is a difference between the first radial distance and the second radial distance; and
      wherein the radial distances from the central axis to intermediate points, respectively, on the outer periphery of said substantially cylindrical portion that are between the first point and the second point vary continuously from the minimum distance to the maximum distance; and
    a yoke comprising a bifurcated piece, said bifurcated piece having a bearing hole capable of housing said shell type needle roller bearing.

* * * * *